Patented Aug. 6, 1946

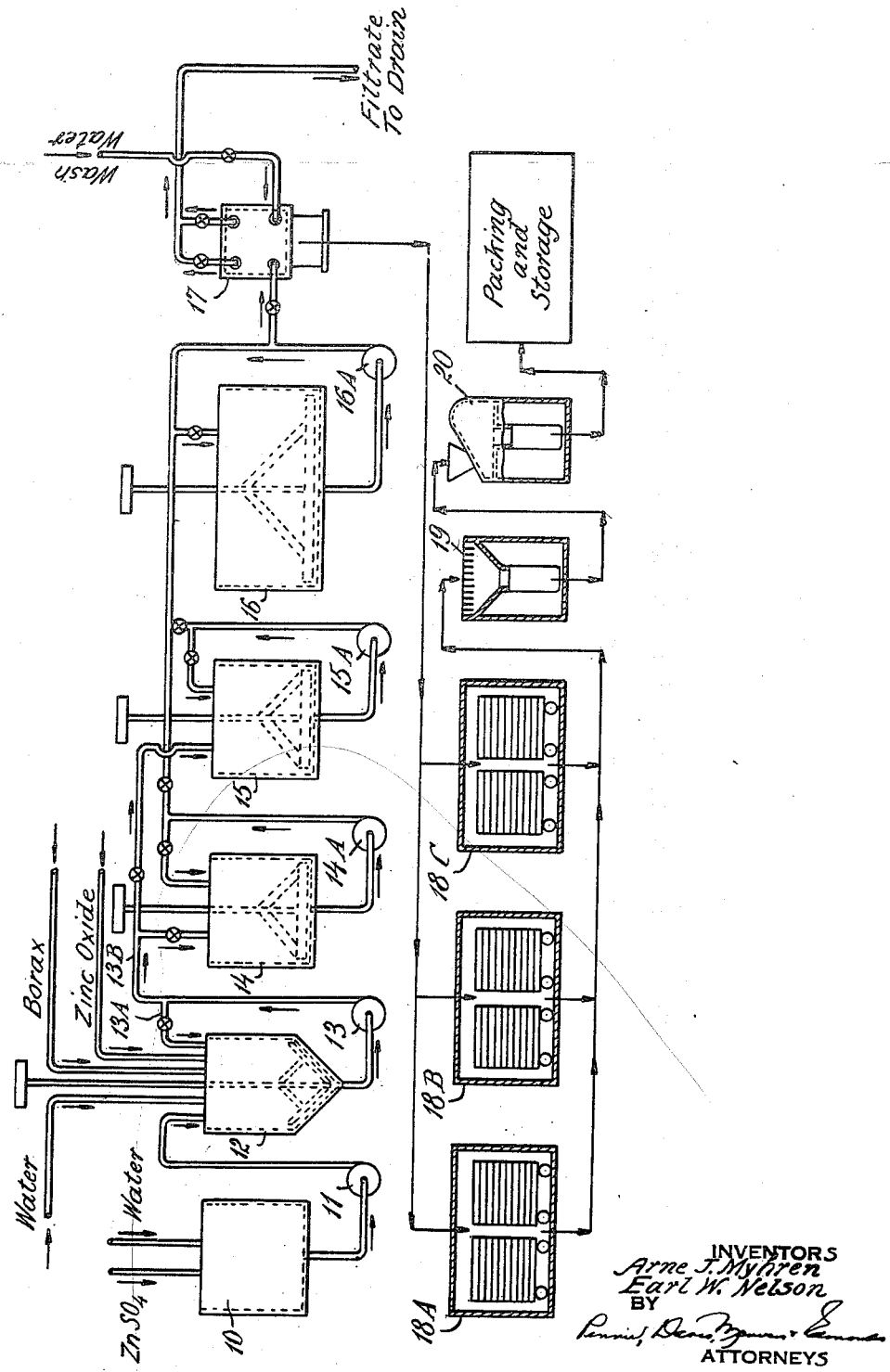

2,405,366

UNITED STATES PATENT OFFICE 2,405,366

MANUFACTURE OF ZINC BORATE

Arne J. Myhren and Earl W. Nelson, Palmerton, Pa., assignors to The New Jersey Zinc Company, New York, N. Y., a corporation of New Jersey Application October 12, 1943, Serial No. 505,954

4 Claims. (Cl. 23—59)

This invention is concerned with the production of zinc borate and provides improvements in methods for such production to the end that zinc borate of low free zinc oxide content may be formed.

Zinc borate, i. e. $2ZnO.3B_2O_3.7H_2O$, imparts fire resistance to certain coatings and plastics. In certain vehicles it is used to impart flame resistance, char resistance and resistance to afterglow to fabrics in which it is incorporated. Free zinc oxide present in the zinc borate (either as an unreacted residue of zinc oxide used in the production of the borate, or formed subsequently by hydrolysis) may bring about excessive stiffening in such fabrics.

In accordance with the instant invention, zinc borate distinguished by a very low content of free zinc oxide may be prepared. Such zinc oxide has a greatly decreased tendency to cause stiffening of fabrics and is a superior product for flame-proofing, etc.

In accordance with the invention, zinc borate is produced by mixing borax and zinc sulfate in aqueous solution and thereafter introducing finely-divided zinc oxide thereinto. The zinc oxide may be prepared separately or formed in situ. The borax and zinc sulfate should be thoroughly mixed in aqueous solution prior to the introduction of the zinc oxide, especially when the zinc oxide is formed separately. The term "zinc oxide" is used to include hydrated oxide or zinc hydroxide.

The zinc oxide is preferably in the form of a fresh precipitate. Uncalcined wet process zinc oxide is suitable. A fresh zinc oxide precipitate is preferable and may be formed in situ by the reaction of alkali metal hydroxide with the zinc sulfate. Generally speaking, the fresher the zinc oxide the lower the content of free ZnO in the resulting zinc borate. The best product is formed when the zinc oxide is formed in situ in the solution, although reasonably satisfactory results are obtained with precipitated zinc oxide which has not been calcined. Calcined zinc oxide or zinc oxide formed by pyrometallurgical means is relatively unreactive and when employed in the practice of the invention tends to give a fairly high content of free zinc oxide in the product.

As indicated above, the borax and zinc sulfate solutions should be thoroughly mixed in a preliminary operation to bring about the reaction

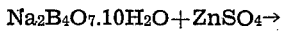
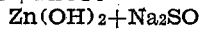

$Na_2B_4O_7.10H_2O + ZnSO_4 \rightarrow$
$Zn(OH)_2 + Na_2SO_4 + 4H_3BO_3 + 3H_2O$ If the mixing is insufficient, free zinc sulfate will remain in the solution and this zinc sulfate will react with the zinc oxide to form a precipitate of insoluble and relatively unreactive basic zinc sulfate. Ordinarily, it is sufficient to agitate the borax and the zinc sulfate solution for half an hour before adding the zinc oxide.

The zinc oxide (or zinc hydroxide) may be formed in situ by adding sodium hydroxide to the solution obtained by mixing the borax and zinc sulfate. The sodium hydroxide reacts with the zinc sulfate, which should be present in excess, to form zinc hydroxide. This reacts with the boric acid to form the zinc borate.

The borax, the zinc sulfate, and the zinc oxide should be employed in substantially the mol proportions indicated by the composition $$2ZnO.3B_2O_3.7H_2O$$

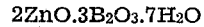

The particle size of the zinc borate precipitate is governed by the rate and manner of the mixing of the borax and the zinc sulfate. If the borax is added at too slow a rate or if zinc sulfate is employed in too high a concentration in the precipitating slurry, the product is coarse and gritty. Conversely, abnormally rapid rates of borax addition or abnormally low concentrations of zinc sulfate in the precipitating slurry produce an extremely fine, bulky product.

For a wide range of precipitating conditions, the sulfur content of the washed zinc borate is low. However, in cases of extremely slow borax addition or of unusually high zinc sulfate concentration in the precipitating slurry, an appreciable amount of water insoluble sulfur may remain in the washed product.

When the zinc oxide has been added to the mixture made from the borax and the zinc sulfate, agitating for 18 to 20 hours is desirable to complete the reaction. The treatment, i. e. the agitation should be carried out at room temperature since at higher temperatures zinc borate tends to be decomposed by hydrolysis.

The practice of our invention will be understood more thoroughly in the light of the following detailed description, taken in conjunction with the accompanying flow sheet.

Referring to the flow sheet, it will be observed that the zinc sulfate solution is introduced into a storage tank 10, for example a 2000 gallon wood stave tank. The zinc sulfate solution is moved through a pump 11 into a make-up tank 12 where it is mixed preliminarily with borax. The make-up tank conveniently is a 700 gallon rubber lined steel tank with a close clearance rubber covered agitator operating at 66 R. P. M. The mixing of the borax and the zinc sulfate solution may be facilitated by means of a pump 13 which draws material from the bottom of the make-up tank and either returns it to this tank through a line 13A or advances it into aging agitators through a line 13B.

For example 230 gallons of zinc sulfate solution containing 225 pounds of Zn, 230 gallons of water and 1310 pounds of commercial granulated borax are agitated in the make-up tank for half an hour at room temperature. Thereafter 270 pounds of zinc oxide (for example, commercial zinc oxide of good grade) are added. The zinc oxide is thoroughly dispersed in the reacting mixture by agitation and the resulting slurry is pumped by the pump through the line 13B into the aging tanks 14, 15. These are 800 gallon wooden tanks equipped with a bottom sweep agitator operating at 15 R. P. M., and provided respectively with pumps 14A, 15A which can be employed either for recirculation or forwarding. Following the first two aging tanks in the series is a third aging tank 16. This is a 2,000 gallon wooden tank provided with a bottom sweep agitator operating at 19 R. P. M. and equipped with a pump 16A for recirculation or forwarding.

The slurry is agitated for 18 or 20 hours at room temperature in the aging tanks and thereafter is sent to a filter press 17. This is conveniently a 36 inch rubber covered cast iron Shriver washing type filter press with a capacity of 26 cubic feet. After the slurry has been filtered, the filter cake is washed with an amount of water equivalent to about one gallon of water per pound of dry filter cake (i. e. about 900 gallons of water per press load). The washing of the filter cake should be carried out as rapidly as possible to restrict possible hydrolysis of the zinc borate. The filtrate from the filter press is sent to waste and the filter cake is sent to a group of driers 18A, 18B, 18C. Thus 3-truck, steam heated cabinet driers may be employed, the drying temperature being 110–140° C. The dried zinc borate is removed from the drier and passed through a 3-inch grizzly screen 19 and thence into a disintegrator 20, for example a 12-inch Mikro pulverizer with a $\frac{3}{16}$-inch punched plate and special screw discharge for filling bags. The product from the Mikro pulverizer is sent to packing and storage.

In the operation just described, the zinc oxide employed was not precipitated in situ. When this expedient is employed, the practice is approximately as follows:

Starting with about 70 gallons of water in the make-up tank 12, a measured quantity of zinc sulfate (about 805 pounds in about 335 gallons of solution) is added at a rate of $3\frac{1}{2}$ gallons per minute. After about 7 minutes of this addition a total of 1570 pounds of borax is added in 100-pound lots at 7 minute intervals. After all of the borax and zinc sulfate have been added and the mixture has been thoroughly agitated 69.5 pounds of sodium hydroxide (NaOH) dissolved in 40 gallons of water is added over a period of about ½ hour. The mixture is agitated continuously during the addition of the sodium hydroxide and agitation is continued for at least 6 hours more.

The zinc oxide (really zinc hydroxide) precipitated by the sodium hydroxide reacts more rapidly to form zinc borate than does commercial zinc oxide added as such and therefore gives a product containing a lower proportion of free zinc oxide.

When the zinc oxide is formed in situ, the rate of the zinc borate precipitation is controlled by the rate of borax addition, and the concentration of the zinc sulfate in the reaction mixture, as described hereinbefore.

We claim:

1. The process for producing a zinc borate of the composition $2ZnO.3B_2O_3.7H_2O$ which comprises mixing borax and zinc sulfate in solution and precipitating zinc borate in the presence of sufficient additional zinc compound from the group consisting of zinc oxide and zinc hydroxide to provide a ratio of zinc to boron of 1:3.

2. In the process of claim 1, forming the additional zinc compound by precipitating it in situ in said solution.

3. In the process of claim 1, forming the additional zinc compound by precipitating it from aqueous solution.

4. In the process of claim 1, forming the additional zinc compound by precipitating it in situ in said solution through introduction of an alkali metal hydroxide.

ARNE J. MYHREN.
EARL W. NELSON.